April 6, 1943. B. W. WYMAN. Re. 22,298

GAS BLAST CIRCUIT BREAKER

Original Filed June 14, 1941

Inventor:
Bryce W. Wyman,
by Harry E. Dunham
His Attorney.

Reissued Apr. 6, 1943

Re. 22,298

UNITED STATES PATENT OFFICE 22,298

GAS BLAST CIRCUIT BREAKER

Bryce W. Wyman, Yeadon, Pa., assignor to General Electric Company, a corporation of New York Original No. 2,306,240, dated December 22, 1942, Serial No. 398,128, June 14, 1941. Application for reissue February 4, 1943, Serial No. 474,727

4 Claims. (Cl. 200—148)

My invention relates to gas blast circuit breakers wherein the arc to be interrupted is confined in an insulating structure and traversed by a blast of gas flowing at high velocity under pressure, and has for its principal object the provision of an improved method of operation of and structural arrangement for a circuit breaker of the aforesaid type so that it is particularly adapted for interrupting heavy currents throughout a wide range of line voltage.

The interruption of heavy overload and short circuit currents at moderate voltages, such as 15 kv., has been efficiently accomplished by a cross-blast type air circuit breaker wherein the arc is driven by a transverse blast of gas into an arc chute having insulating barriers or partitions extending edgewise to and transversely of the arc stream. The hot blast gases flowing from the region of arcing are directed to exhaust through the chute passages defined by the aforesaid partitions. Such a circuit breaker is disclosed and claimed in application Serial No. 303,126 filed November 6, 1939, by D. C. Prince et al. for "Circuit breaking apparatus and method of operating the same" now Patent No. 2,284,842 issued June 2, 1942 and assigned to the same assignee as the present invention. When this type circuit breaker is used for interrupting power currents at appreciably higher voltages, such as 50 kv., insulation difficulties appear and, instead of clearing the circuit, the breaker may fail due to flashover.

In accordance with my invention, the desirable current interrupting characteristics of the aforesaid cross-blast type breaker are retained and the voltage range of the breaker is appreciably increased by incorporating in the circuit breaker structure auxiliary means for subjecting the arc to a high velocity axial blast prior to completion of the breaker opening operation.

My invention will be more fully set forth in the following description referring to the accompanying drawing, and the features of novelty which characterize my invention will be pointed out with particularity in the claims annexed to and forming a part of this specification.

Figure 1:
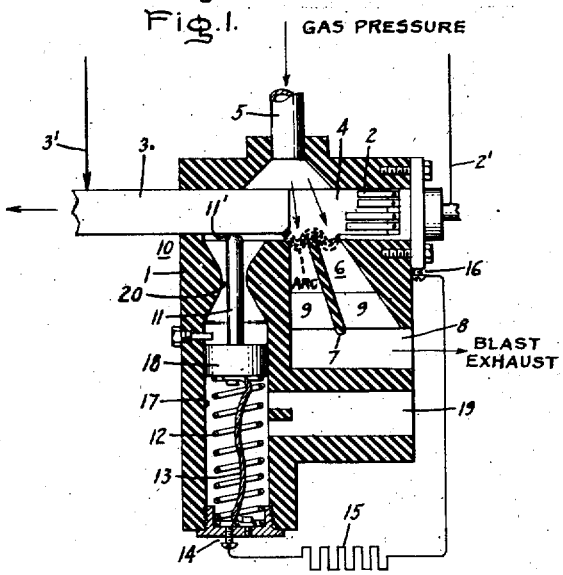
Figure 2:
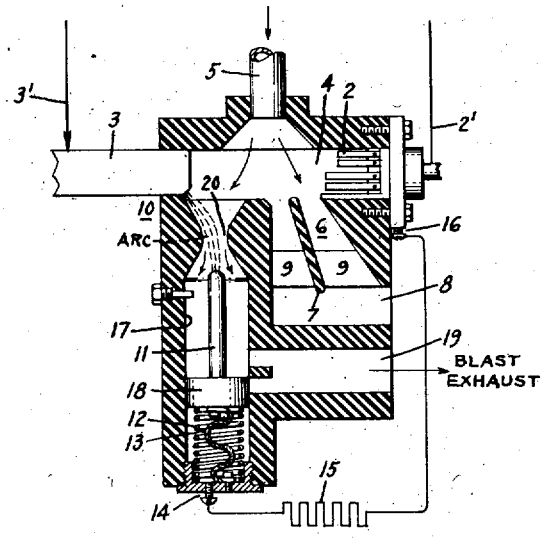

Referring to the drawing, Fig. 1 is an elevational view in section of a gas blast circuit breaker embodying my invention in an initial stage of the opening operation, and Fig. 2 is a similar view illustrating the final stage of a high voltage circuit interrupting operation.

The circuit breaker illustrated by way of example in Figs. 1 and 2 comprises an insulating housing 1 defining arc extinguishing structure in which are mounted for relative movement the breaker contacts 2 and 3. The contact 2, which may be of any suitable type, such as the resilient finger type, is shown as fixed in the housing and is connected to one line terminal of the breaker indicated at 2'. The contact 3 is formed as a blade member and is reciprocally movable in the insulating housing with respect to the fixed contact 2, and is electrically connected as indicated to the other line terminal of the breaker at 3'.

The contacts 2 and 3 are separable within a narrow slot-like passage 4 in the housing and this passage is arranged to be connected at one side to a source of gas pressure indicated at 5, and at the opposite side (for the first part of the contact opening movement) with an arc chute 6. The chute 6 is provided with at least one insulating barrier or partition 7 dividing the chute into blast passages that are vented to atmosphere at 8. The hot blast gases flowing from the region of arcing at 4 are cooled by means of spaced metallic plates disposed edgewise to the gas flow as indicated at 9. The insulating barrier 7 is preferably composed of a vaporizable insulating material, such as hard fibre, that does not lose its dielectric strength in the presence of the arc. An arc chute of this character is disclosed and claimed in the Prince et al. application above-identified.

When the breaker is to be opened, the movable contact 3 is actuated by suitable means (not shown) toward the left as viewed in Fig. 1 so as to separate from contact 2 and form an arc gap opposite the entrance of the chute 6. At practically the same instant, the interrupting gas is admitted under pressure by way of the conduit 5 to the passage 4 so that the resulting blast of gas necessarily traverses the arc between the contacts 2 and 3 and drives it sideward against the insulating barrier 7 on its way to exhaust from the chute passage 8. At this stage of the opening operation, the gas blast is effective to interrupt very heavy currents at the first current zero.

In the case of high voltage circuits and circuits having a high rate of rise of recovery voltage, this interruption at the first current zero may not be permanent and the dielectric strength of the gap so formed between the contacts may be insufficient to prevent voltage breakdown and reestablishment of arcing. This difficulty in clearing the circuit is overcome in accordance with my invention by connecting in shunt with the contacts during the initial opening operation, and in series therewith for the final interrupting operation an auxiliary gas blast circuit breaker of the axial blast type, preferably in series with a resistance.

To this end, an auxiliary gas blast switch of the axial blast type generally indicated at 10 is disposed adjacent to the path of movement of the blade contact 3 so that the auxiliary switch 10 is in electrical contact with the blade 3 during the initial part of the opening movement to shunt the original arc gap and is placed in series with the blade contact and breaker terminals immediately upon interruption of the arc at the first current zero in the chute 6. In a simplified arrangement, the auxiliary breaker 10 comprises a movable rod contact 11 that is resiliently biased, such as by a spring 12, into sliding electrical contact at 11' with the blade 3. The rod contact 11 is also electrically connected through a flexible conductor 13 to a terminal indicated at 14, which is in turn electrically connected through a resistance 15 to the breaker line terminal 2' as indicated at 16. The rod contact 11 is guided for reciprocal movement in a cylinder 17 formed in the main insulating housing and includes a piston 18 which functions both as a guide for the rod contact and as a valve for uncovering the blast vent port 19 leading from the cylinder 17. The rod contact 11 is operable within a restricted nozzle-like passage 20 communicating with the cylinder 17 located a short distance beneath the point of contact engagement with the blade 3.

From the above description, it will be seen that immediately upon interruption of the main power arc at a current zero in the chute 6, the auxiliary breaker 10 and the resistor 15 are connected in series with the breaker terminals 2' and 3'. Accordingly, the current as reestablished after the current zero through this connection will be of decreased magnitude, and in addition the power factor will be improved. Therefore, when the blade contact 3 in continuing its opening movement uncovers the aforesaid nozzle passage and moves out of engagement with the rod contact 11 of the auxiliary breaker, the resulting arc, which is immediately drawn into the restricted nozzle 20 due to the action of blast pressure from 5 on the piston 18, is more readily extinguished by the high velocity constricted axial blast within the insulating nozzle as clearly indicated by Fig. 2. When the auxiliary breaker contact reaches the position shown by Fig. 2, the blast passage 19 is also uncovered so that the gas blast can sweep unhindered through and longitudinally of the arc path. This blast flows through as well as longitudinally (or axially) of the arc stream and the arrangement avoids many of the insulation difficulties of other types of gas blast breakers. The axial blast arrangement above described has been found to be particularly adapted for interrupting high voltage circuits, although it is not so well adapted as the cross blast type above described for interrupting heavy currents. Therefore by first interrupting the heavy current arc momentarily at a current zero, at which time a resistance is automatically inserted in the circuit, and then by interrupting the reduced current in the manner above described, it will be seen that I provide means for interrupting high voltage power circuits not heretofore provided in the known types of gas blast breakers.

It will also be seen that the gas pressure within the nozzle passage is caused to build up until the contact piston-valve 18 opens the blast exhaust vent. This increased gas pressure in the region of arcing is an additional asset during the interruption operation since the dielectric strength of the gas is thereby increased.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. A gas blast circuit breaker for high voltage power circuits comprising contacts including a movable contact separable to form an arc gap, an arc chute having an entrance opposite the initially formed part of said gap, means for directing an interrupting blast of gas through said initially formed part of the arc gap to drive the arc into said chute for extinguishing it at a current zero, a resistance arranged to be connected in shunt with said part of said gap whereby a reestablished power current is reduced, and a separately operable auxiliary gas blast circuit breaker connected in series with said resistance, said auxiliary breaker having a blast operated movable contact coacting with the aforesaid movable contact to form an arc gap and having a nozzle-like arc interrupting passage for said last-formed arc gap, and means for directing a second gas blast into said nozzle-like passage axially of the arc for finally interrupting the reduced current arc therein.

2. A gas blast circuit breaker for high voltage power circuits comprising relatively fixed and movable contacts separable to form an arc gap, an arc chute having an entrance opposite the initially formed part of said gap, means for directing an interrupting blast of gas through and across said initially formed part of the arc gap to drive the arc into said chute for extinguishing it at a current zero, a resistance arranged to be connected in shunt with said part of said gap whereby a reestablished power current is reduced, and a separately operable auxiliary gas blast circuit breaker included in said shunt connection having a separate movable contact operable in response to gas pressure to form a second arc gap, said auxiliary breaker having a nozzle-like arc interrupting passage in which said second arc gap is formed, and means for directing a second gas blast into said nozzle-like passage axially of the arc for finally interrupting the reduced current arc therein, said second gas blast also being effective to build up pressure in said passage to cause opening movement of said movable auxiliary breaker contacts.

3. A gas blast circuit breaker for high voltage power circuits comprising relatively movable contact structure separable to form an arc gap, an arc chute having insulating partitions forming arc barriers and having an entrance opposite an initially formed part of said gap, means for directing an interrupting blast of gas transversely through said initially formed part of the arc gap so as to drive the arc into said chute against said barriers for extinguishing the arc at a current zero, a resistance arranged to be connected in shunt with said part of said gap whereby a reestablished power current is reduced, and a separately operable auxiliary gas blast circuit breaker included in the resistance shunt connection and having a movable contact arranged to make electrical contact with the aforesaid relatively movable contact structure so as to form a second arc gap only after predetermined separation of said contact structure, said auxiliary breaker having a nozzle-like arc interrupting passage through which said auxiliary contact is movable and in which said second arc gap is formed, and means for directing a second gas blast into and through said nozzle-like passage axially of the arc causing opening movement of said auxiliary contact and for finally interrupting the reduced current arc.

4. A gas blast circuit breaker for high voltage power circuits comprising an arc chamber, separable contacts including a movable contact arranged to form an arc gap in said chamber, means for directing a blast of interrupting gas under pressure into said chamber and through said arc gap for extinguishing the arc at a current zero, a resistance arranged to be connected in shunt with said gap whereby a re-established power current is reduced in magnitude, and a separately operable auxiliary gas blast circuit breaker included in said shunt connection having a separate movable contact arranged to form a second arc gap, said auxiliary breaker having a nozzle-like arc interrupting passage in which said second arc gap is formed, and means for directing a second gas blast into said nozzle-like passage axially of the arc for finally interrupting the reduced current arc therein, said second gas blast also being effective to build up pressure in said passage to cause opening movement of said movable auxiliary breaker contact.

BRYCE W. WYMAN.